United States Patent [19]

Schmidt et al.

[11] 4,226,460
[45] Oct. 7, 1980

[54] LONG-DISTANCE TRUCK CABIN

[76] Inventors: Werner Schmidt, Vogelloh 54, 8000 Munich 50; Walter Scholz, Trivastr. 3/0, 8000 Munich 19, both of Fed. Rep. of Germany

[21] Appl. No.: 937,867

[22] Filed: Aug. 29, 1978

[30] Foreign Application Priority Data

Sep. 1, 1977 [DE] Fed. Rep. of Germany ....... 7727143

[51] Int. Cl.³ ............................................... B60R 5/00
[52] U.S. Cl. ............................................... 296/37.7
[58] Field of Search ................ 296/37.7, 97 G, 97 E; 160/368 R, 368 S

[56] References Cited

U.S. PATENT DOCUMENTS

| | | | |
|---|---|---|---|
| 2,978,274 | 4/1961 | Ordman | 296/97 G |
| 3,923,339 | 12/1975 | McDonald | 160/368 S |
| 4,079,987 | 3/1978 | Bumgardener | 296/37.7 |

Primary Examiner—John J. Love
Assistant Examiner—John A. Carroll
Attorney, Agent, or Firm—Haseltine, Lake & Waters

[57] ABSTRACT

A long-distance truck or trailer cabin in which a bin is arranged above the windshield in an angular space between the roof and the front wall of the cabin. The bin is confined by a horizontal bottom and a rear end wall. The bin, furthermore, has a sliding curtain arranged at the front wall and the side walls to cover the side windows and the windshield. The curtain, moreover, is suspended in a continuous runner. A compartment is provided in a recess in the horizontal bottom at substantially the center of the cabin. The compartment has a downward-directed opening and a cover which is pivotally supported by horizontal hinges. The runner extends across the opening section of the compartment. The cover may be provided with a shape conforming to a bulging cylindrical shelf or cupped saucer. A curtain, furthermore, may part vertically at substantially the center of the cabin.

8 Claims, 1 Drawing Figure

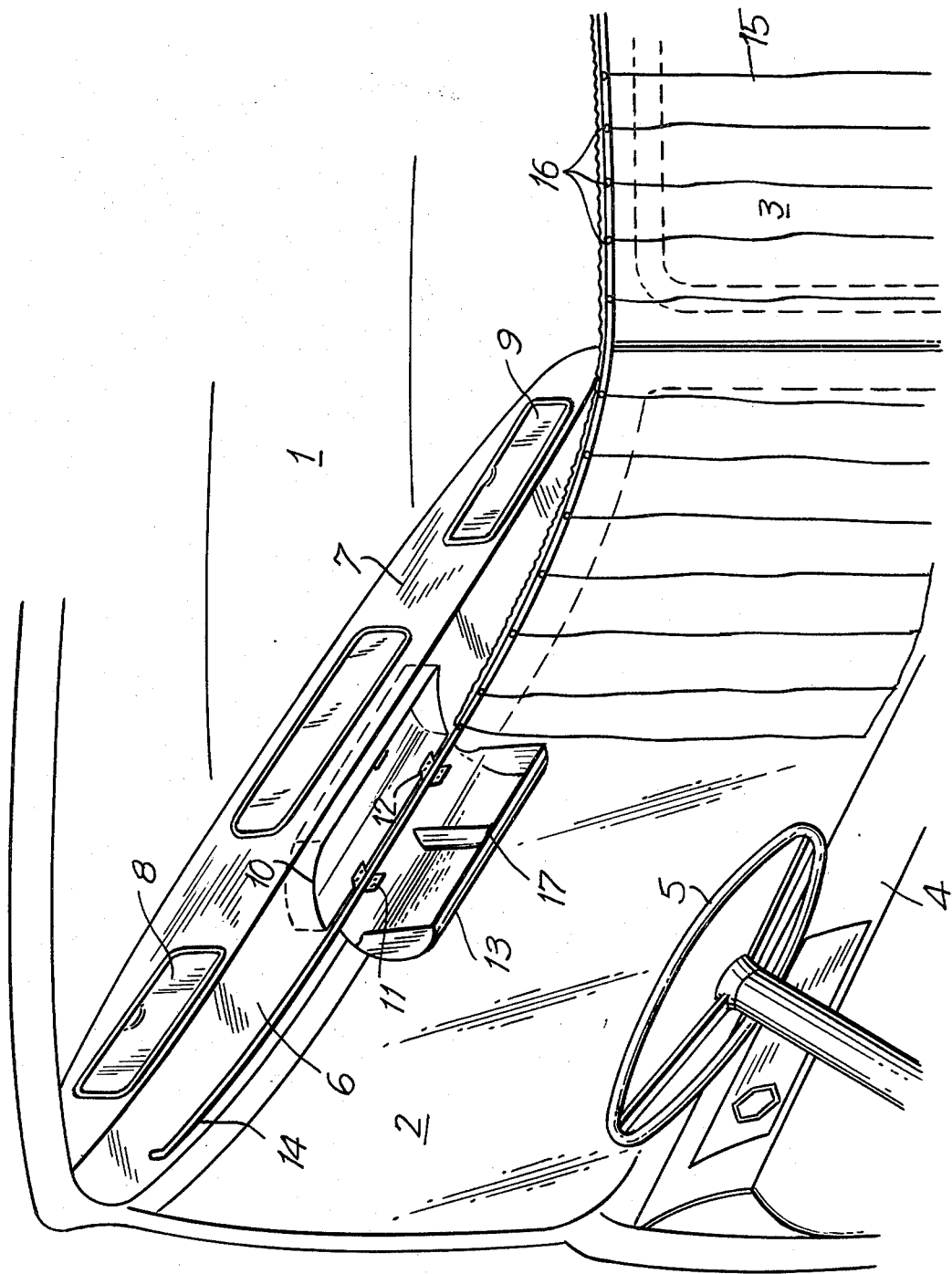

LONG-DISTANCE TRUCK CABIN

BACKGROUND OF THE INVENTION

The present invention relates to a long-distance truck cabin having a bin arranged above the windshield or windscreen in the angular space between the roof and the front wall. This bin is confined by a horizontal bottom and a rear end wall, and has a sliding curtain arranged at the front wall and the side walls to cover the side windows and the windscreen. The curtain is suspended in a continuous runner.

While it has long been a common practice to arrange curtains in long-distance truck cabins to cover the windscreen and the side windows, such long-distance truck cabins normally serving as sleeping cabins as well, no practical provision has yet been found for stowing the curtain when not in use, i.e., when it is not intended to cover the window panes. Such stowing provisions would nevertheless be welcome for a number of reasons. It is very annoying, e.g., to have the curtain, which has considerable width, flutter about in a draft in the cabin when drawn back. Another disadvantage is that the curtain will soon become dirty when continuously allowed to hang in the open.

It is an object of the present invention to provide long-distance truck cabin of the above generic category such that is has provision for stowing the curtain when not in use. The curtain is to be folded into the stowing device and withdrawn from it, with a minimum of delay.

It is a particular object of the present invention to provide a truck cabin where a compartment opening to below is arranged in a recess in the horizontal bottom of the storage bin in approximately the center of the cabin. The compartment is to be closed by a cover pivotally supported by horizontal hinges. A runner is to extend across the opening section of this compartment.

Another object of the present invention is to provide an arrangement of the foregoing character which is substantially simple in construction and may be economically fabricated.

A further object of the present invention is to provide an arrangement, as described, which may be readily maintained and serviced and which has a substantially long service life.

SUMMARY OF THE INVENTION

The objects of the present invention are achieved by providing that to stow the curtain in a simple manner in the compartment arranged in the storage bin, it is gathered in the center in front of the opening section of the compartment, rolled up neatly, and inserted into the compartment, after which the cover is closed. In the process, the curtain remains engaged in the runner.

In a preferred embodiment of the present invention the cover takes the shape of a bulging cylindrical shell. This shape enables the curtain, when rolled up for stowing, to be placed in the bulging cover, which is then folded upwards.

In a further arrangement of the present invention the curtain parts vertically in about the center of the cabin. This makes it possible to cover one side window and half the windscreen with one curtain and leave the other one stowed in the compartment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

A portion of a long-distance truck or trailer cabin seen in oblique view from the lower left-hand side, in accordance with the present invention.

DESCRIPTION OF THE PREFERRED EMBODIMENTS

The roof of the cabin is indicated by the numeral 1, a windscreen by 2, and a right-hand side window by 3. A dashboard 4 and steering wheel 5 are outlined below the windscreen. A storage bin is formed by a horizontal bottom 6 and a vertical rear end wall 7 in the angular space between the roof 1 and a front wall extending vertically upwards from the upper edge of the windscreen 2 to the roof. Such a storage bin is commonly provided in the cabins of long-distance trucks and serves to accommodate compartments covered by hinged doors as outlined by the flaps 8 and 9 in the driver and co-driver areas. In the center of the storage bin a compartment 10 opening downwards is arranged in the horizontal bottom 6. The compartment is closed by a cover 13 pivotally supported by horizontal hinges 11, 12 and a curtain runner 14 extends across its opening section. Suspended in the runner 14 continuing across the entire front wall above the wind screen 2, and across the side walls, is a sliding curtain 15 held by means of standard curtain hooks 16.

The curtain 15 shown here is one of two curtains provided. A second curtain provided for the driver side of the truck cabin has been omitted for clarity of presentation. The curtain 15 can be gathered in front of the opening section of the compartment 10, rolled up, and inserted into the cupped cover 13. The cover 13 is then folded upwards and held in the horizontal bottom 6 by means of a suitable latch 17. The cover 13, together with the compartment 10, provides just enough space for stowing the curtain 15 and a second curtain of equal length for the driver's side of the cabin.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A long-distance truck cabin comprising: windshield means; bin means above said windshield means in an angular space between a roof and front wall of said truck cabin; a horizontal bottom and a rear end wall confining said bin means; sliding curtain means at the front wall and side walls of said truck cabin for covering side windows and said windshield means; continuous curtain runner means for suspending said curtain means; compartment means in a recess in said horizontal bottom in substantially the center of said cabin; said compartment means having an opening in a downward direction; said compartment means having cover means pivotally supported by horizontal hinge means; said continuous curtain runner means extending across said opening whereby said curtain means may be stored in said compartment means when not in use.

2. A long-distance truck cabin as defined in claim 1 wherein said cover means has the shape of a bulging cylindrical shell.

3. A long-distance truck cabin as defined in claim 1 wherein said cover means has the shape of a cupped saucer.

4. A long-distance truck cabin as defined in claim 1 wherein said curtain means parts vertically in substantially the center of said cabin.

5. A long-distance truck cabin as defined in claim 1 wherein said cover means has the shape of a bulging substantially cylindrical shelf, said curtain means parting vertically in substantially the center of the cabin.

6. A long-distance truck cabin as defined in claim 1 wherein said cover means has the shape of a substantially cupped saucer, said curtain means parting vertically in substantially the center of the cabin.

7. A sliding curtain stowing device for a vehicle having bin means, a sliding curtain means for covering side windows and windshield of the vehicle and a continuous curtain runner means for suspending curtain means, which comprises:
 (a) a compartment means arranged in a recess in a horizontal bottom of said bin means;
 (b) a cover means pivotally supported for covering said compartment means; and
 (c) a curtain runner means crossing an opening of said compartment means so that the curtain when not in use, is being gathered and rolled in front of an opening section of said compartment means and the rolled curtain is inserted into said cover means.

8. A sliding curtain stowing device as recited in claim 7 further comprises a latch in the compartment means to fold upward said cover means and to hold securely into the horizontal bottom of said bin means.

* * * * *